US009351252B2

(12) United States Patent
Knowles

(10) Patent No.: US 9,351,252 B2
(45) Date of Patent: May 24, 2016

(54) METHOD AND SYSTEM FOR WIRELESSLY TRANSMITTING DATA

(71) Applicant: Imagination Technologies Limited, Kings Langley (GB)

(72) Inventor: Ian R. Knowles, Burnham (GB)

(73) Assignee: Imagination Technologies Limited, Kings Langley (GB)

( * ) Notice: Subject to any disclaimer, the term of this patent is extended or adjusted under 35 U.S.C. 154(b) by 24 days.

(21) Appl. No.: 14/021,211

(22) Filed: Sep. 9, 2013

(65) Prior Publication Data
US 2014/0086124 A1 Mar. 27, 2014

(30) Foreign Application Priority Data
Sep. 26, 2012 (GB) .................................. 1217206.0

(51) Int. Cl.
*H04W 52/02* (2009.01)
*G08B 25/00* (2006.01)
*G08B 25/10* (2006.01)

(52) U.S. Cl.
CPC ......... *H04W 52/0229* (2013.01); *G08B 25/007* (2013.01); *G08B 25/10* (2013.01); *H04W 52/0277* (2013.01)

(58) Field of Classification Search
None
See application file for complete search history.

(56) References Cited

U.S. PATENT DOCUMENTS

| 7,848,271 | B2 * | 12/2010 | Salomone | H04W 52/0229 370/310 |
| 7,881,755 | B1 * | 2/2011 | Mishra | H04W 52/0229 455/574 |
| 7,961,661 | B2 * | 6/2011 | Hargrave | H04L 12/66 370/311 |
| 8,199,686 | B1 * | 6/2012 | Donovan | H04W 52/0212 370/311 |

(Continued)

FOREIGN PATENT DOCUMENTS

WO 2010051119 A 5/2010

OTHER PUBLICATIONS

Chandra et al., "Beacon-Stuffing: WiFi Without Associations", retrieved from http://research.microsoft.com/pubs/73482/beaconstuffing.pdf on Jan. 24, 2012.

(Continued)

*Primary Examiner* — Timothy J Weidner
*Assistant Examiner* — Jana Blust
(74) *Attorney, Agent, or Firm* — Vorys, Sater, Seymour and Pease LLP; Vincent M DeLuca

(57) ABSTRACT

Methods and systems for wirelessly transmitting data between Wi-Fi stations without requiring the Wi-Fi stations to be fully connected to the Wi-Fi network. A first Wi-Fi station generates the data to be transmitted. The data comprises status data and/or wake-up data. The first Wi-Fi station then inserts the data in a vendor-specific information element of a probe request frame and wirelessly transmits the probe request frame. The probe request frame is then received by a second Wi-Fi station. If the probe request frame contains wake-up data and the second Wi-Fi station is operating in a low-power mode when it receives the probe request frame, the second Wi-Fi station will wake-up from the low-power mode. If the probe request frame contains status data then the second Wi-Fi station may process the probe request frame and/or forward at least a portion of the received probe request frame to another device.

19 Claims, 10 Drawing Sheets

(56) References Cited

U.S. PATENT DOCUMENTS

| | | | | |
|---|---|---|---|---|
| 8,204,029 | B2* | 6/2012 | Stephenson | H04L 63/10 370/332 |
| 8,654,773 | B2* | 2/2014 | Wentink | H04W 74/085 370/230 |
| 8,848,730 | B1* | 9/2014 | Vleugels | H04W 8/005 370/304 |
| 2005/0034001 | A1* | 2/2005 | Pontarelli | 713/320 |
| 2005/0286456 | A1 | 12/2005 | McNew et al. | |
| 2011/0185200 | A1* | 7/2011 | Sim | G06F 1/3203 713/310 |
| 2012/0026996 | A1* | 2/2012 | Yamaguchi | H04B 1/406 370/338 |
| 2012/0033568 | A1* | 2/2012 | Park | H04W 76/023 370/252 |
| 2013/0051293 | A1* | 2/2013 | Wentink et al. | 370/311 |
| 2013/0227152 | A1* | 8/2013 | Lee et al. | 709/227 |
| 2014/0198725 | A1* | 7/2014 | Abraham et al. | 370/328 |
| 2014/0219148 | A1* | 8/2014 | Zhao et al. | 370/311 |
| 2014/0233443 | A1* | 8/2014 | Kumar | H04L 12/12 370/311 |
| 2014/0254513 | A1* | 9/2014 | Abraham et al. | 370/329 |

OTHER PUBLICATIONS

Dobre et al., "Mobile Advertisement in Vehicular Ad-Hoc Networks", retrieved from http://arxiv.org/ftp/arxiv/papers/1202/1202.2573.pdf on Jan. 24, 2012.

Gupta et al., "Information Embedding in IEEE 802.11 Beacon Frame" retrieved from http://research.ijcaonline.org/ctngc/number3/ctngc1027.pdf on Jan. 24, 2012.

* cited by examiner

METHOD AND SYSTEM FOR WIRELESSLY TRANSMITTING DATA

BACKGROUND

For a Wi-Fi station to send data within a Wi-Fi network, the station must obtain a unique address, namely an IP address from a Wi-Fi access point. To keep the IP address and channel alive, the station must be validly connected to the network which requires the station's Wi-Fi module to be powered on. This inherently consumes more power than if the Wi-Fi module is turned off or is in another lower power mode.

Known solutions to this are to keep the Wi-Fi module on in a low-power state by extending the Wi-Fi Beacon dwell time or to take the device off the network (powering down the Wi-Fi module) and then restarting the network connection when needed.

The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for wirelessly transmitting data between Wi-Fi stations without requiring the Wi-Fi stations to be fully connected to the Wi-Fi network. A first Wi-Fi station generates the data to be transmitted. The data comprises status data and/or wake-up data. The first Wi-Fi station then inserts the data in a vendor-specific information element of a probe request frame and wirelessly transmits the probe request frame. The probe request frame is then received by a second Wi-Fi station. If the probe request frame contains wake-up data and the second Wi-Fi station is operating in a low-power mode when it receives the probe request frame, the second Wi-Fi station will wake-up from the low-power mode. If the probe request frame contains status data then the second Wi-Fi station may process the probe request frame and/or forward at least a portion of the received probe request frame to another device.

A first aspect provides a method to wirelessly transmit data, the method comprising: generating at a first Wi-Fi station data to be transmitted to another Wi-Fi station, the data comprising at least one of status data and wake-up data; inserting at the first Wi-Fi station the generated data in a vendor-specific information element of a probe request frame; and wirelessly transmitting at the first Wi-Fi station the probe request frame.

A second aspect provides a Wi-Fi station to wirelessly transmit data, the Wi-Fi station comprising: a processor configured to: generate data to be transmitted to another Wi-Fi station, the data comprising at least one of status data and wake-up data; and insert the generated data in a vendor-specific information element of a probe request frame; and a Wi-Fi module configured to wirelessly transmit the probe request frame.

A third aspect provides a system to wirelessly transmit information, the system comprising: a first Wi-Fi station, the first Wi-Fi station comprising: a processor configured to: generate data to be transmitted to another Wi-Fi station, the data comprising at least one of status data and wake-up data; and insert the generated data in a vendor-specific information element of a probe request frame; and a Wi-Fi module configured to wirelessly transmit the probe request frame; and a second Wi-Fi station configured to: receive the probe request frame; and execute one or more actions upon receiving the probe request frame.

A fourth aspect provides a method for waking up a Wi-Fi station from a low-power mode, the method comprising: operating the Wi-Fi station in a low-power mode; receiving at the Wi-Fi station a probe request frame; determining whether the received probe request frame comprises a vendor-specific information element comprising wake-up data; if the probe request frame comprises the vendor specific information element comprising wake-up data, waking up the Wi-Fi station from the low-power mode.

A fifth aspect provides a Wi-Fi station comprising: a Wi-Fi module configured to wirelessly receive a probe request frame; and a processor configured to: operate the Wi-Fi device in a low power-mode; determine whether the received probe request frame comprises a vendor-specific information element comprising wake-up data; and if the probe request frame comprises the vendor specific information element comprising wake-up data, wake-up the Wi-Fi station from the low-power mode.

The methods described herein may be performed by a computer configured with software in machine readable form stored on a tangible storage medium e.g. in the form of a computer program comprising computer program code for configuring a computer to perform the constituent portions of described methods. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
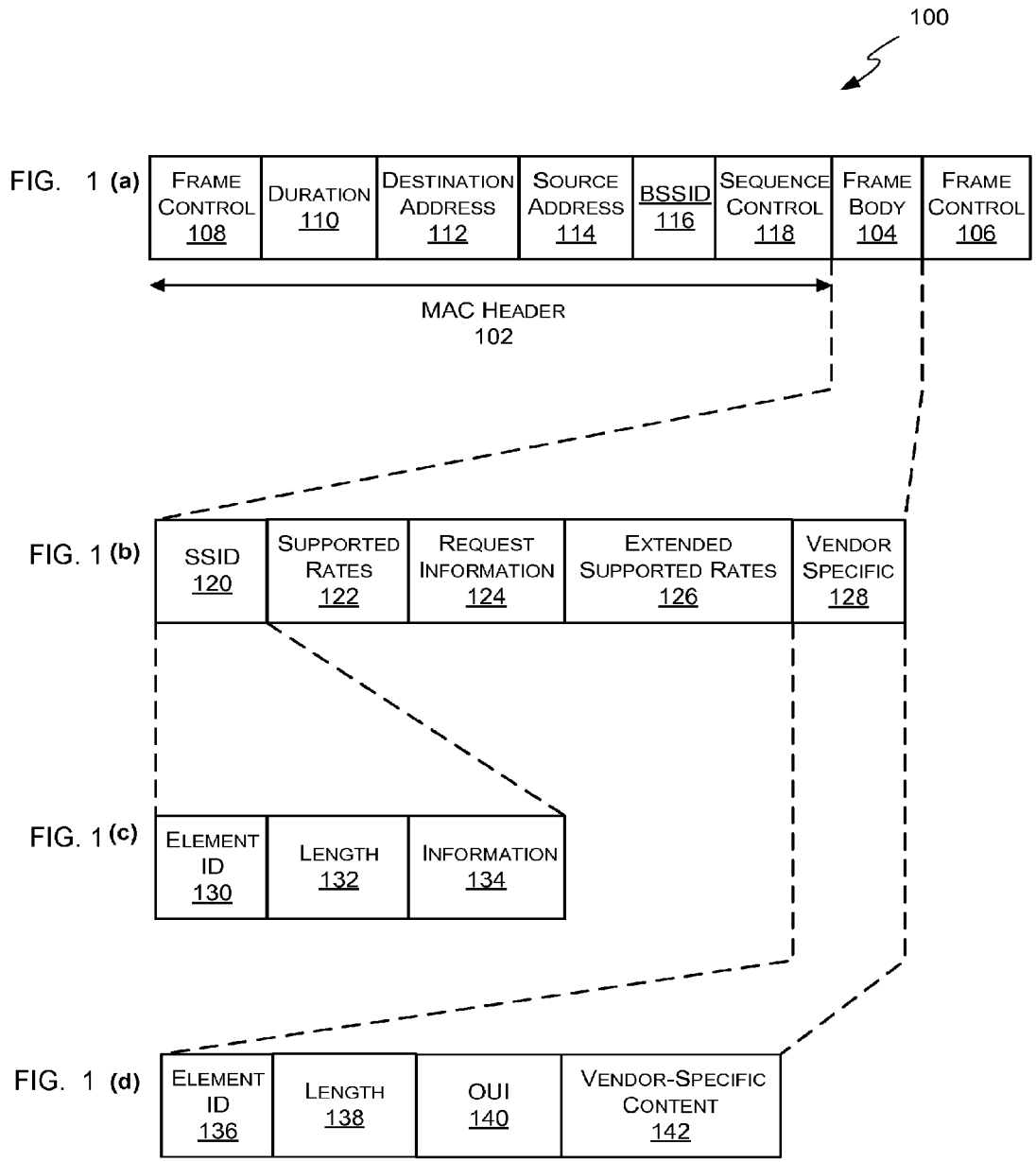
FIG. 1a is a schematic diagram of an IEEE 802.11 management frame.
FIG. 1b is a schematic diagram of the frame body of a probe request frame.
FIG. 1c is a schematic diagram of a generic information element of FIG. 1b.
FIG. 1d is a schematic diagram of the vendor-specific information element of FIG. 1b.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The term "Wi-Fi network" is used herein to mean a wireless local area network that is based on the Institute of Electrical and Electronics Engineers (IEEE) 802.11 standards. The term "Wi-Fi station" is used herein to mean an electronic device that has a Wi-Fi module that allows the device to exchange data wirelessly using the IEEE 802.11 standards.

Embodiments described herein relate to methods and systems for using the vendor-specific information element in a probe request frame to receive and/or send data to/from Wi-Fi stations without requiring the Wi-Fi stations to be fully connected to the Wi-Fi network (e.g. the station does not require a valid IP address).

When a Wi-Fi station wants to join a Wi-Fi network it either performs passive or active scanning to determine what networks are within range of the device. In passive scanning, the station listens for beacon frames from access points. Since access points typically only send beacon frames every 100 ms it may take up to 100 ms to receive a periodic beacon broadcast. In active scanning, the station transmits a probe request frame and then waits to hear any probe responses or periodic beacons.

The probe request frame may be either directed or broadcast. A directed probe request contains a specific Service Set Identifier (SSID) and only access points with a matching SSID will respond with a probe response. As is known to those of skill in the art an SSID is a sequence of alphanumeric characters (letters or numbers) that uniquely defines a Wi-Fi network. All access points and stations attempting to connect to a specific Wi-Fi network use the same SSID. A broadcast probe request contains a broadcast SSID (a null SSID) and all access points receiving the probe request will respond with a probe response for each SSID they support. The station then processes the received probe responses to determine which access point to associate with.

IEEE 802.11 management frames enable stations to establish and maintain communications. To ensure that all access points and stations in a Wi-Fi network can properly identify management frames they have a standard frame format shown in FIG. 1a. Specifically, each management frame 100 comprises a MAC (Media Access Control) header portion 102, a frame body portion 104, and a frame control portion 106. The MAC header portion 102 comprises a frame control field 108, a duration field 110, a destination address field 112, a source address field 114, a Basic Service Set Identification (BSSID) field 116, and a sequence control field 118. As is known to those of skill in the art a single access point together with all associated stations is called a Basis Service Set (BSS). The access point acts as master to the stations within that BSS. Each BSS is identified by a BSSID. In an infrastructure BSS, the BSSID is the MAC address of the access point.

A probe request frame is a specific sub-type of management frame thus it has the basic frame format shown in FIG. 1a. The difference between probe request frames and other management frames is the format of the frame body portion 104. According to the IEEE 802.11 standard, the frame body portion 104 of a probe request frame has the format shown in FIG. 1b. Specifically, the frame body portion 104 of a probe request comprises one or more information elements. According to the IEEE 802.11 standard, a probe request must comprise an SSID information element 120 and a supported rates information element 122.

The SSID information element 120 is used to identify an SSID. When the probe request is a directed probe request the SSID information element 120 comprises a specific SSID. Conversely, when the probe request is a broadcast probe request, the SSID information element 120 comprises a null SSID. The SSID information element 120 may be between 2 and 34 octets.

The supported rates information element 122 is used to specify the transmission rates supported by the station. Up to eight transmission rates may be specified. The supported rates information element 122 may be between 3 and 10 octets.

The frame body 104 of a probe request frame may also comprise one or more of the following fields: a request information element 124, an extended supported rates information element 126 and a vendor specific information element 128.

The request information element 124 is used to request that any responding station include the requested information in their probe response. The request information element 124 typically comprises the element IDs of the information requested listed in order of increasing element ID.

The extended supported rates information element 126 is used when the station supports more than 8 transmission rates. Specifically, where a station supports more than 8 transmission rates the additional transmission rates are listed in the extended supported rates information element 126.

Each of the information elements, with the exception of the vendor-specific information element 128, has the format shown in FIG. 1c. Specifically, each information field (excluding the vendor-specific information field 128) comprises an element ID portion 130, a length portion 132 and an information portion 134. The element ID portion 130 identifies the specific type of information field. The element IDs for each of the information fields that may appear in a probe request are shown in Table 1. The length portion 132 specifies the length of the information element. The information portion 134 includes the information specific to the particular information element.

TABLE 1

| Information Element | Element ID | Length (in octets) |
| --- | --- | --- |
| SSID | 0 | 2 to 34 |
| Supported Rates | 1 | 3 to 10 |
| Request Information | 10 | 2 to 256 |
| Extended Supported Rates | 50 | 3 to 257 |
| Vendor-Specific | 221 | 3 to 257 |

The vendor-specific information element 128 may be used to carry information not defined in the IEEE 802.11 standard and has the format shown in FIG. 1*d*. Specifically, it comprises an element ID portion 136, a length portion 138, an Organizational Unique Identifier (OUI) portion 140 and a vendor-specific content portion 142. The element ID portion 136 and the length portion 138 correspond to the element ID portion 130 and the length portion 132 of the generic information element as described in reference to FIG. 1*c*. The OUI portion 140 includes a set of alphanumeric characters that uniquely identifies a vendor. The IEEE assigns OUIs to vendors. The OUI is sometimes referred to as the vendor ID. The vendor-specific content portion 142 may contain any content and is only limited by the maximum frame size.

The inventor has identified that since: (1) probe requests may be sent by any Wi-Fi device (e.g. it is not limited to access points) without requiring the Wi-Fi device to be fully connected to the Wi-Fi network, and (2) the vendor-specific information element 128 may contain any data in any format, the probe request may be used for transmitting small amounts of data between Wi-Fi devices in a power-efficient manner.

In a first aspect the vendor-specific information element 128 is used to tell a Wi-Fi station operating in a low power mode that it should "wake-up" from the low-power mode. The term "wake-up" is used herein to mean that the station changes operation from the low-power mode to a higher power mode to enable the station to perform one or more actions. The higher power mode may be full power mode or a mode between full power mode and the low power mode. This enables a Wi-Fi station to enter into a low-power mode (and thus conserve power) when it is not needed and quickly come back on-line when it is needed. In the low-power mode the Wi-Fi station is simply listening for Wi-Fi management frames. This aspect will be described in reference to FIGS. 2 to 6.

Figure 2:
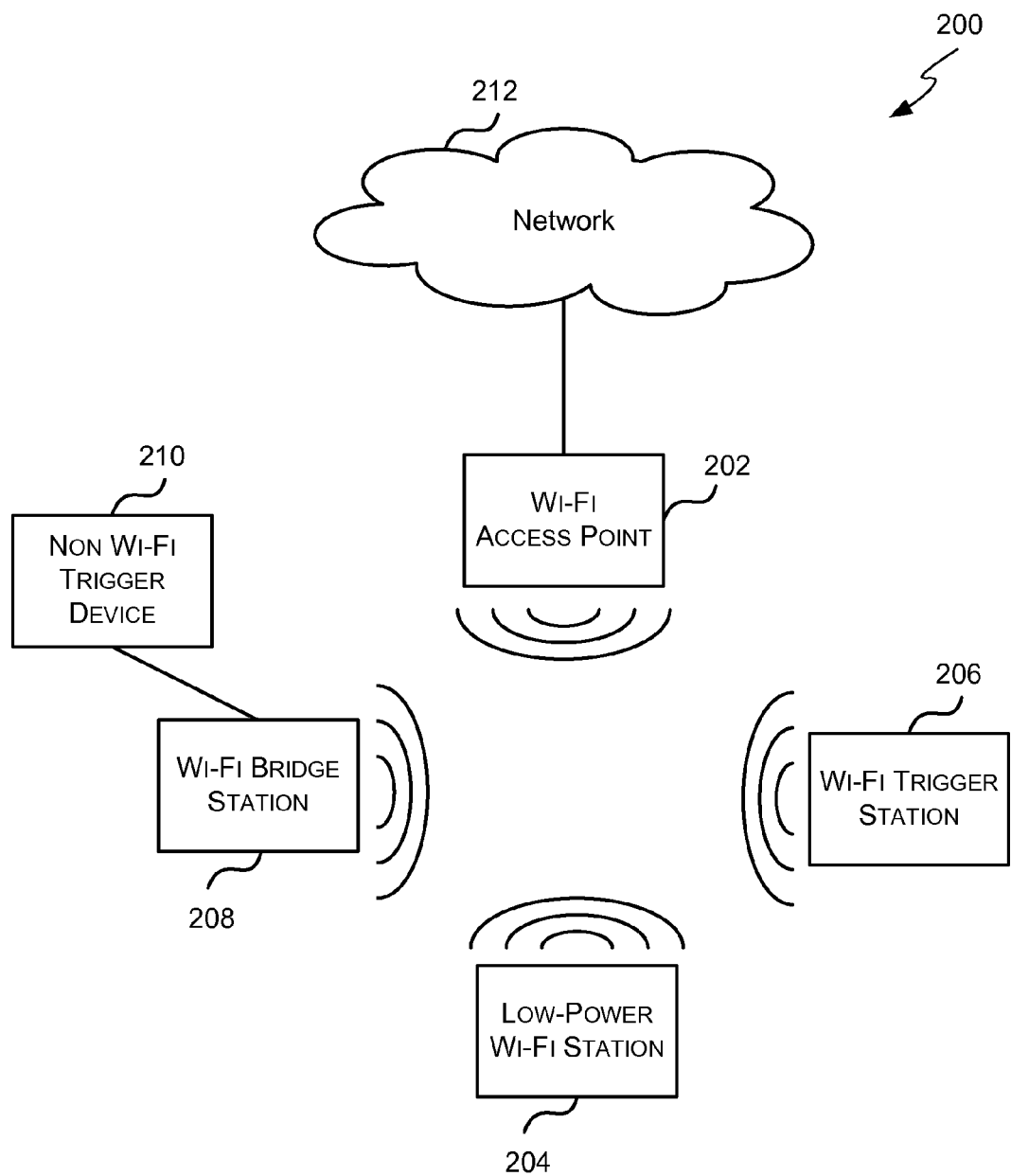
FIG. 2 is a block diagram of a system for using the vendor-specific information element of FIGS. 1b and 1d to instruct a Wi-Fi station to "wake-up" from a low-power mode.

Reference is now made to FIG. 2 which illustrates a system 200 for using the vendor-specific information element 128 to cause a Wi-Fi station to "wake-up" from a low-power mode. The system 200 comprises a Wi-Fi access point 202, a low-power Wi-Fi station 204, a Wi-Fi trigger station 206, a Wi-Fi bridge station 208, and a non Wi-Fi trigger device 210.

The Wi-Fi access point 202 allows Wi-Fi stations (e.g. Wi-Fi stations 204, 206 and 208) within range of the access point 202 to connect to a common Wi-Fi network and communicate with each other via the common Wi-Fi network. The Wi-Fi access point 202 may also be connected to another communication network 212, such as the Internet, which the Wi-Fi stations 204, 206 and 208 may access via the Wi-Fi access point 202.

The Wi-Fi stations 204, 206 and 208 are computer-based devices that comprise a processor and a Wi-Fi module. The Wi-Fi module enables the Wi-Fi station 204, 206 or 208 to wirelessly communicate with other devices using the IEEE 802.11 standard. The Wi-Fi stations 204, 206 and 208 may be, but are not limited to, cameras, laptops, personal computers, tablet computers, mobile phones, radios, other audio devices, and smoke detectors.

The low-power Wi-Fi station 204 is a Wi-Fi station that that has the ability to operate in a low-power mode where one or more modules of the station 204 are suspended to conserve power. A module is considered to be "suspended" if has been de-clocked, put into hibernation, paused, de-selected or otherwise put into a particular state to conserve power. The low-power mode may be a conventional Wi-Fi low power mode where the Wi-Fi station agrees with the Wi-Fi access point 202 to enter a low-power mode. When the Wi-Fi station is operating in a conventional Wi-Fi low power mode the Wi-Fi access point 202 buffers any packets for the Wi-Fi station for a number of beacon counts so the Wi-Fi station can operate in a low-power mode during the buffering period. At the end of the buffering period the Wi-Fi station wakes up to stay connected to the Wi-Fi network. However, it is not necessary for the low-power Wi-Fi station 204 described herein to be in a conventional Wi-Fi low power mode to be operating in a "low-power mode" as that term is used herein. Specifically, the low-power mode described herein does not require the Wi-Fi station to wake up periodically to stay active on the network. As long as at least one module is suspended to conserve power the low-power Wi-Fi station will be understood as being in a low-power mode.

The low-power Wi-Fi station 204 may go into the low power mode when certain predetermined conditions are met. The predetermined conditions may comprise, for example, but are not limited to, one or more of: a predetermined time has elapsed since the station has sent/received data over/from the Wi-Fi network; the capacity of the battery for a battery-operated station has fallen below a predetermined threshold; according to a schedule (e.g. a low-power Wi-Fi station may be configured to go into a low-power mode at a certain time each day); based on an alarm state (e.g. armed or unarmed); detecting the presence of a user (e.g. the Wi-Fi station may detect the presence of the user via a key fob or similar device); and receiving notification that the master device (e.g. a master device in a multi-room audio system) is going to sleep.

When the low-power Wi-Fi station 204 is operating in the low-power mode the station 204 listens to the 802.11 management packets for a special probe request frame. The special probe request frame comprises a vendor-specific information element that comprises wake-up data indicating the low-power Wi-Fi station 204 should wake-up. This type of probe request will be referred to herein as a wake-up probe request. Upon receiving a wake-up probe request, the low-power Wi-Fi station 204 "wakes-up" from the low-power mode (e.g. it switches to a higher power mode by enabling one or more modules that were suspended to conserve power). The low-power Wi-Fi station 204 may then execute one or more actions.

In some cases the wake-up probe request may be generated by a Wi-Fi trigger station 206 when one or more predetermined conditions are met. A Wi-Fi trigger station 206 is a Wi-Fi station that is able to generate wake-up probe requests. For example, in a home security system the Wi-Fi trigger station 206 may be a motion detector or other sensor, and the low-power Wi-Fi station 204 may be a video camera. The motion detector may be configured to generate a wake-up probe request frame when it detects motion (e.g. an intruder). Upon receiving the wake-up probe request frame, the video camera may "wake-up" from the low-power mode and start recording video.

In other cases the wake-up probe request may be generated and transmitted by a Wi-Fi bridge or hub station 208. A Wi-Fi bridge or hub station 208 is a Wi-Fi station that has the ability to communicate using at least one other communications protocol in addition to Wi-Fi (e.g. IEEE 802.11). The other communication protocol may be, for example, Bluetooth™, Digital Enhanced Cordless Telecommunications (DECT), ZigBee™, G.hn, Token Ring, Ethernet, Digital Living Network Alliance (DLNA), Universal Plug and Play (uPnP), or HomePlug.

The Wi-Fi bridge or hub station 208 may receive instructions to generate a wake-up probe request from a Non-Wi-Fi trigger device 210 using another communication protocol. A Non-Wi-Fi trigger device 210 is a device that has the ability to detect when a wake-up probe request should be generated, but cannot communicate with the Wi-Fi network and thus cannot generate a wake-up probe request. The Non-Wi-Fi trigger device 210 may be unable to communicate with the Wi-Fi network because for example, it does not have a Wi-Fi module or it is not within range of the Wi-Fi network.

For example, in a home security system comprising a motion sensor and a video camera, the motion sensor may not have Wi-Fi capability so it may be connected to the Wi-Fi bridge or hub station 208 via a wired connection, such as Ethernet. The motion sensor then acts as the Non-Wi-Fi trigger device 210. Specifically, when the motion sensor detects motion (e.g. an intruder) it may be configured to notify the Wi-Fi bridge or hub station 208. Upon receiving such a notification, the Wi-Fi bridge or hub station 208 generates and transmits a wake-up probe request frame. Upon receiving the wake-up probe request frame, the video camera may "wake-up" and start recording video.

In some cases, the wake-up probe request may be in the form of a broadcast probe request (as described above in Reference to FIG. 1) so that it will be processed by any Wi-Fi device within range. This form may be used, for example, to transmit an urgent wake-up probe request (e.g. a wake-up probe request that is triggered by detection of a fire alarm or the like). In other cases, the wake-up probe request may be in the form of a directed probe request (as described above in Reference to FIG. 1) so that it will only be processed by Wi-Fi devices with the SSID specified in the probe request. This form may be used, for example, to target the wake-up probe request to a specific SSID thus reducing the likelihood that the wrong device (e.g. a device part of another BSS) will receive the wake-up probe request. An exemplary wake-up probe request frame format will be described in reference to FIG. 6.

Figure 3:
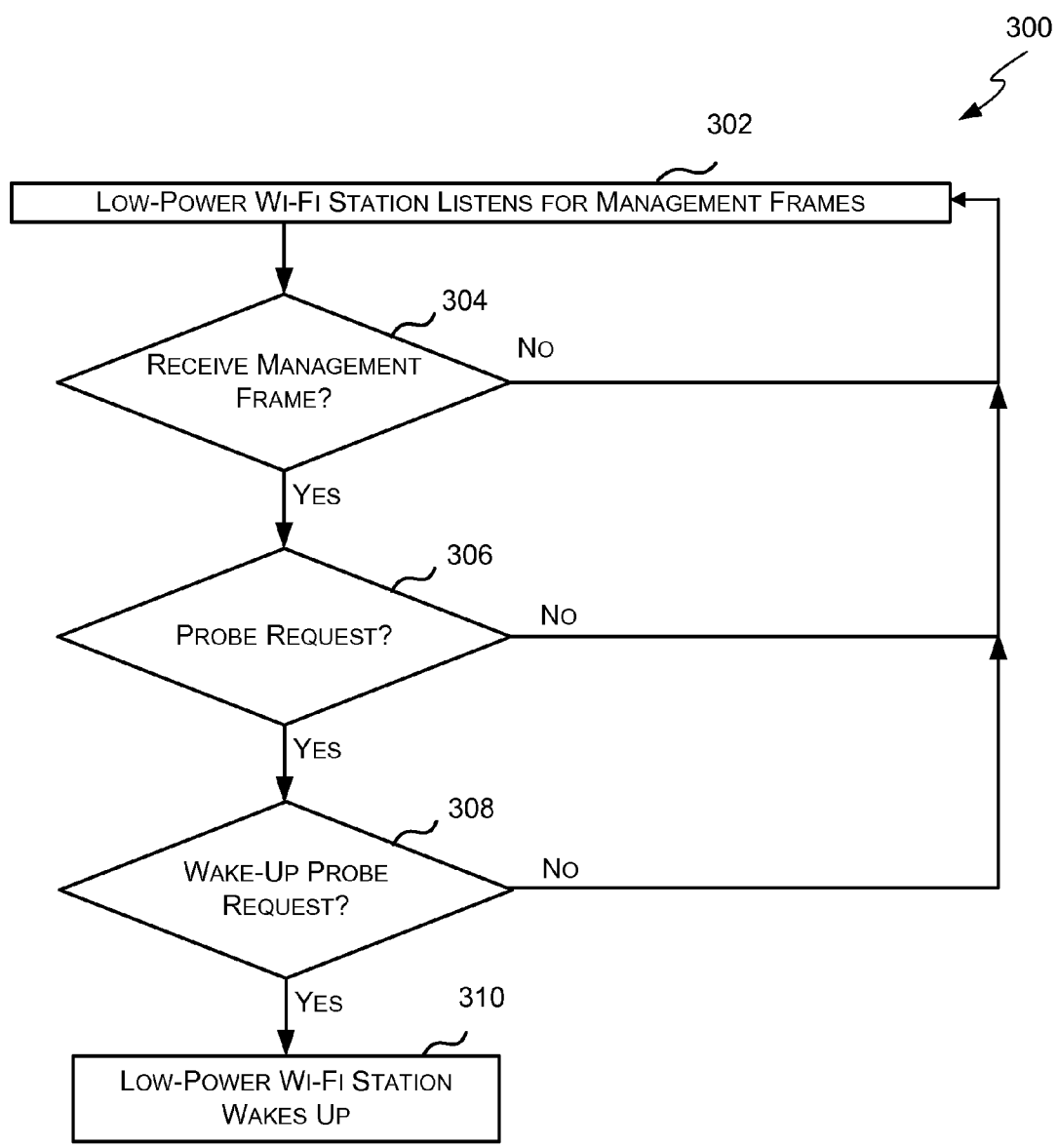
FIG. 3 is a flowchart of a method for causing the low-power Wi-Fi station of FIG. 2 to "wake-up" from a low-power mode.

Reference is now made to FIG. 3 which illustrates a flow chart of a method 300 for causing a low-power Wi-Fi station to "wake-up" from a low-power mode. At step 302, the low-power Wi-Fi station (e.g. Wi-Fi station 204) is operating in the low-power mode and listens for Wi-Fi management frames. At step 304 the low-power Wi-Fi station (e.g. Wi-Fi station 204) determines whether it has received a management frame. If the low-power Wi-Fi station has not received a management frame then the method proceeds back to step 302. If, however, the low-power Wi-Fi station has received a management frame then the method 300 proceeds to step 306.

At step 306, the low-power Wi-Fi station determines whether the received management frame is a probe request. Determining whether the management frame is a probe request may comprise determining whether the frame body has the format described in reference to FIG. 1b. If the low-power Wi-Fi station has determined that the received management frame is not a probe request then the method 300 returns to step 302. If, however, the low-power Wi-Fi station has determined that the received management frame is a probe request then the method proceeds to step 308.

At step 308, the low-power Wi-Fi station determines whether the probe request is a wake-up probe request. Determining whether the probe request is a wake-up probe request may comprise determining whether the probe request comprises a vendor-specific information element that has a predetermined format. If the low-power Wi-Fi station has determined that the probe request is not a wake-up probe request then the method 300 returns to step 302. If, however, the low-power Wi-Fi station has determined the probe request is a wake-up probe request then the method 300 proceeds to step 310.

At step 310, the low-power Wi-Fi station "wakes-up" from the low-power mode. The low-power station may then perform one or more actions. For example, in some cases waking-up may involve generating and transmitting a special probe request in response to the wake-up probe request. In other cases, waking up may comprise powering up or otherwise activating one or more modules that were suspended to conserve power. For example, waking up may comprise enabling one or more modules, such as a TCP/IP module, to enable full Wi-Fi communication. In another example, waking up may comprise enabling one or more modules, such as camera module, to enable non Wi-Fi capability.

In some cases the step(s) taken by the low-power Wi-Fi station to "wake-up" from the low-power mode may be based on the information in the wake-up probe request. Specifically, in some cases the wake-up probe request may comprise action information that identifies an action or set of actions that are to be taken by the low-power Wi-Fi station when it wakes-up from the low-power-mode. For example, the wake-up probe request may specify that a low-power Wi-Fi camera is to start recording video when it wakes-up. In this example, waking up the low-power Wi-Fi station may comprise enabling a camera module.

In some cases, the low-power Wi-Fi station "wakes-up" from the low-power mode upon receiving a wake-up probe request only if it determines that the wake-up probe request is intended for the receiving low-power Wi-Fi station. For example, the wake-up probe request may comprise destination information that identifies a particular low-power Wi-Fi station or a group of Wi-Fi stations. For example, the destination information may comprise a device type that tells all stations of that device type that that the wake-up packet is intended for them; or a serial number or MAC address that tells a particular station that the wake-up packet is intended for it. Accordingly, in these cases the low-power Wi-Fi station may be configured to analyze the destination information in the wake-up probe request prior to waking up from the low-power mode.

Figure 4:
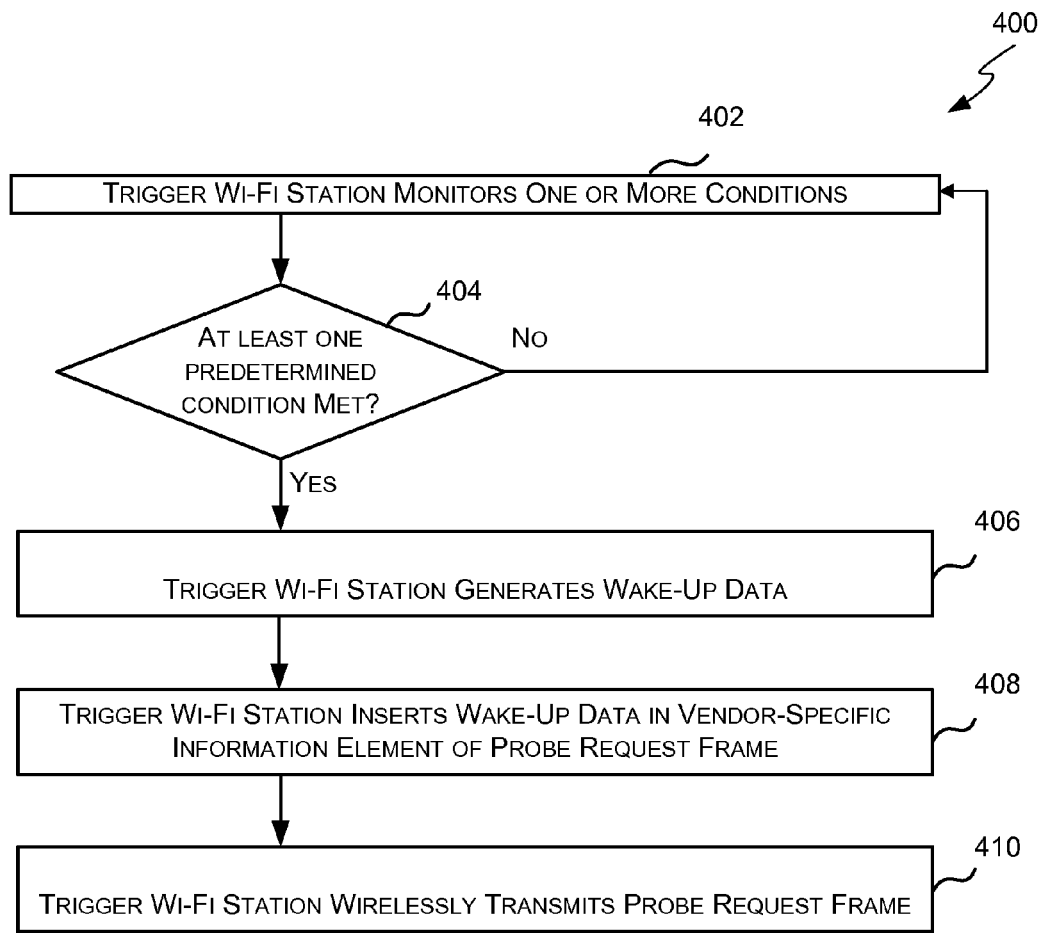
FIG. 4 is a flowchart of a method for the trigger Wi-Fi station of FIG. 2 to generate and transmit a wake-up probe request.

Reference is now made to FIG. 4 which illustrates a flow chart of an exemplary method 400 for a trigger Wi-Fi station to generate and transmit a wake-up probe request. At step 402, the trigger Wi-Fi station (e.g. trigger Wi-Fi station 206) monitors one or more conditions. At step 404, the trigger Wi-Fi station determines whether at least one predetermined condition is met. As described above in reference to FIG. 2, where the trigger Wi-Fi station is a motion sensor in a security system the predetermined condition may be when the motion sensor detects motion. If the trigger Wi-Fi station determines that none of the predetermined conditions are met, then the method proceeds back to step 402. If, however, the trigger Wi-Fi station determines that at least one predetermined condition is met, the method 400 proceeds to step 406. At step 406, the trigger Wi-Fi station generates wake-up data that conforms to a predetermined format (e.g. the format described in reference to FIG. 6). At step 408, the trigger Wi-Fi station inserts the wake-up data in the vendor-specific element of a probe request frame to generate a wake-up probe request frame. At step 410, the trigger Wi-Fi station then wirelessly transmits the wake-up probe request frame.

Figure 5:
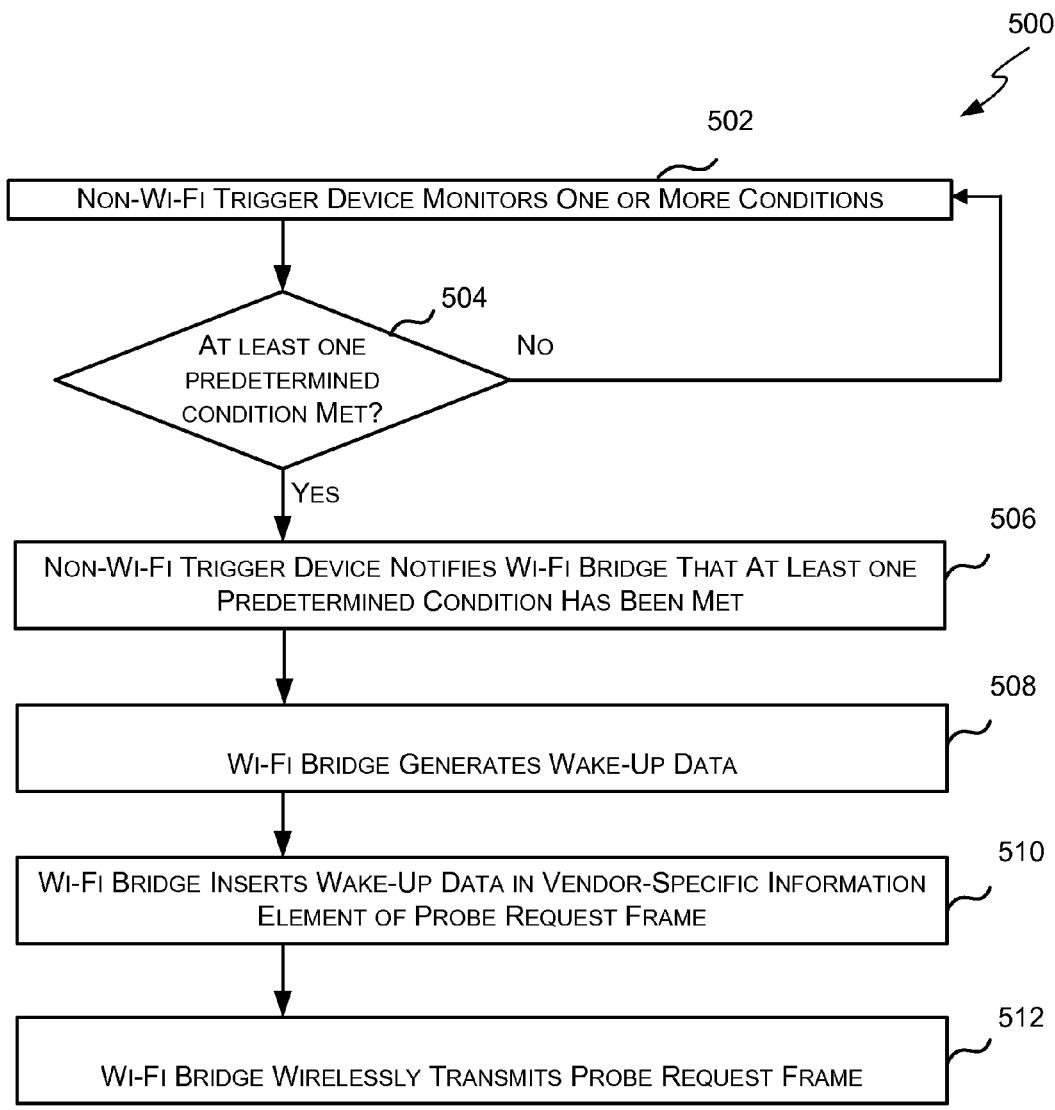
FIG. 5 is a flowchart of a method for the Non-Wi-Fi trigger device of FIG. 2 to trigger generation and transmission of a wake-up probe request.

Reference is now made to FIG. 5 which illustrates a flow chart of a method 500 for a non-Wi-Fi trigger device 210 to trigger the generation and transmission of a wake-up probe request. At step 502, the non-Wi-Fi trigger device (e.g. non-Wi-Fi trigger device 210) monitors one or more conditions. At step 502, the non-Wi-Fi trigger station determines whether at least one predetermined condition as met. As described above in reference to FIG. 2, where the non-Wi-Fi trigger device is a motion sensor in a security system, the predetermined condition may, for example, be met when the motion sensor detects motion. If the non-Wi-Fi trigger device determines that none of the predetermined conditions are met, then the method proceeds back to step 502. If, however, the non Wi-Fi trigger device determines that at least one predetermined condition is met, the method 500 proceeds to step 506. At step 506, the non Wi-Fi device notifies a Wi-Fi bridge or hub station (e.g. Wi-Fi bridge or hub station 208) that the predetermined condition has been met. The notification may be sent from the non Wi-Fi device to the Wi-Fi bridge or hub station using a protocol other than Wi-Fi (IEEE 802.11), such as Bluetooth™, ZigBee™ or Ethernet. The method 500, then proceeds to step 508. At step 508, the Wi-Fi bridge or hub station generates wake-up data that conforms to a predetermined format (e.g. the format described in reference to FIG. 6). At step 510, the Wi-Fi bridge or hub station inserts the wake-up data in the vendor-specific element of a probe request frame to generate a wake-up probe request frame. At step 512, the Wi-Fi bridge or hub station then wirelessly transmits the wake-up probe request frame.

Figure 6:
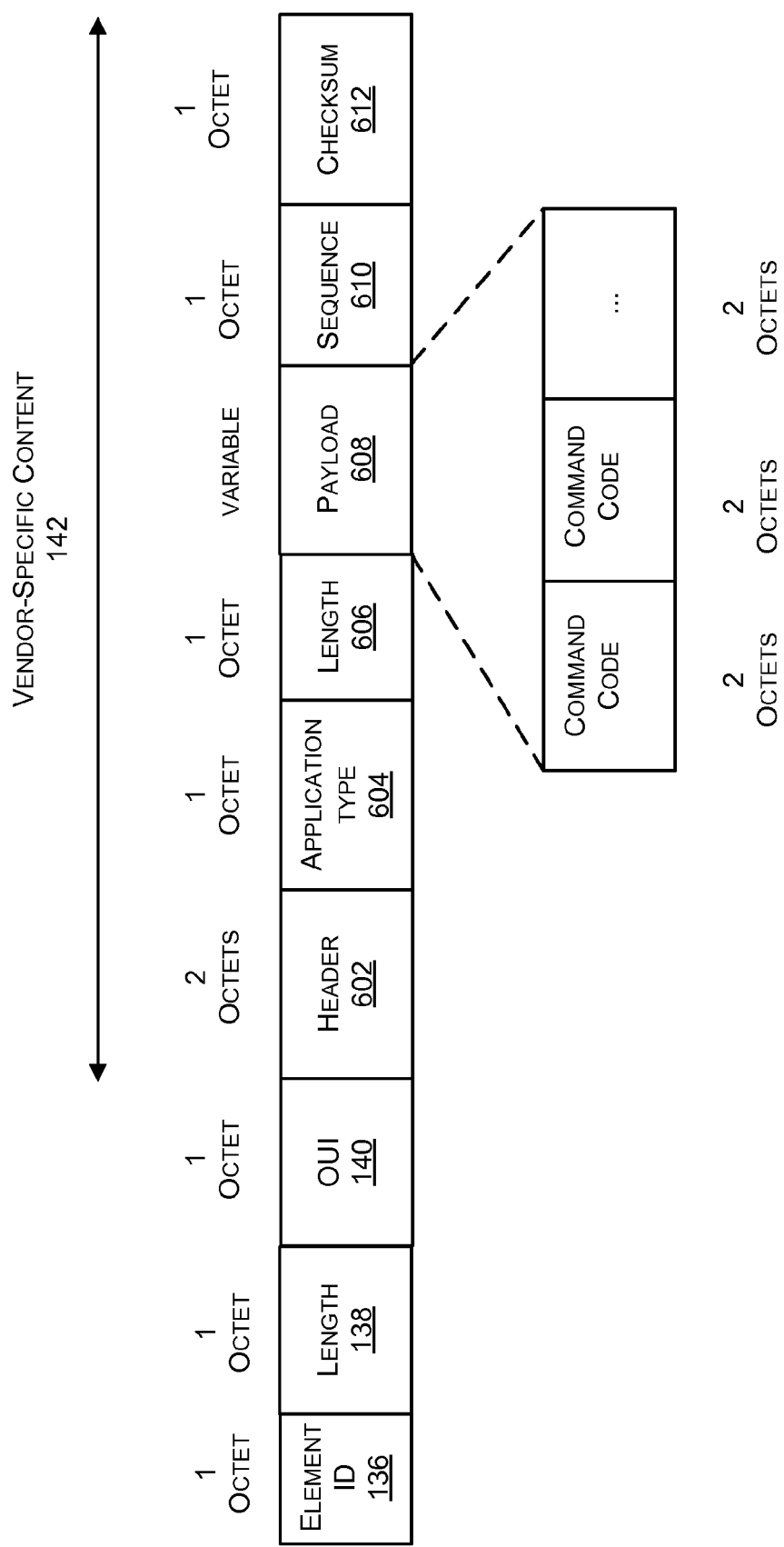
FIG. 6 is a schematic diagram of an exemplary wake-up probe request frame.

Reference is now made to FIG. 6 which illustrates an exemplary format for the vendor-specific information element 128 of a probe request. As described in reference to FIG. 1d, the vendor-specific information element 128 comprises a one octet element ID portion 136, a one octet length portion 138, a one octet OUI portion 140 and a variable length vendor-specific content portion 142. The vendor specific content portion 142 may comprise a header portion 602, an application type portion 604, a length portion 606, a payload portion 608, a sequence portion 610 and a checksum portion 612.

The header portion 602 may be used to identify the probe request as a wake-up probe request. This allows Wi-Fi stations to easily and quickly identify wake-up probe request packets. For example, the header portion 602 may include a particular code (e.g. 0x9000) to indicate that it is a wake-up probe request. Conversely, the header portion 602 may include another code (e.g. 0x8000) to indicate that it is a status probe request (status probe requests are described below in relation to FIGS. 7-10).

The application type portion 604 may identify the device type that the packet is intended for. For example, the application type portion 604 may be used to identify that the frame is intended for a camera or a television.

The length portion 606 is used to specify the length of the payload portion 608 since the payload portion 608 may have a variable length.

The payload portion 608 is where the wake-up data itself is inserted. In some cases the payload portion 608 may comprise a list of command codes, where each command code is two octets and specifies an action that the receiving station should take. Typically, each wake-up probe request comprises at least a wake-up command code. The wake-up command code may be followed by one or more additional command codes specifying an action or actions that the receiving station is to execute upon waking up. Table 2 provides an example list of commands/actions and their associated codes.

TABLE 2

| Command/Action | Value |
| --- | --- |
| Wake-Up | 0x0001 |
| Record Video | 0x0002 |
| Generate Alert | 0x0003 |
| Broadcast Audio | 0x0004 |

It will be evident to a person of skill in the art that the list provided in Table 2 is exemplary and that the methods and systems described herein may be implemented with more or fewer command codes or with a different set of command codes.

The sequence portion 610 may be used to identify a sequence number. The sequence number may be used to enable a large packet to be split into several packets. For example, a sequence number of zero may denote that there are no further packets related to this packet and a sequence number of greater than zero may denote that there are more packets that relate to this packet. Accordingly, the Wi-Fi station generating the wake-up probe request may generate the sequence number based on the size of the data to transmit.

The checksum portion 612 may be used to insert a checksum value to ensure that the vendor specific content portion 142 has been received correctly. As is known to those of skill in the art a checksum value is a value that is generated from at least a portion of data to enable detection of any errors that may have occurred during transmission. Once the data is received at the other end its accuracy can be checked by re-computing the checksum from the received data and comparing it to the checksum in the checksum portion 612. Any suitable checksum algorithm may be used to generate the checksum data, including, but not limited to, parity byte, parity word, modular sum and position dependent checksum. In some cases the vendor specific content portion 142 may also comprise an authentication portion (e.g. an authentication token) to authenticate the sender to the recipient.

The methods and systems described in reference to FIGS. 2 to 6 may be used, for example, in a security system. For example, as described above, the system may comprise a motion sensor (trigger Wi-Fi station 206), a video camera (low-power Wi-Fi station 204) and an alarm generation device (low-power Wi-Fi station 204). The alarm generation device and the video camera may go into a low-power mode until the motion sensor detects motion. Once the motion sensor detects motion it may generate a wake-up probe request for the alarm generation device and video camera. Upon receiving the wake-up probe request the video camera may, for example, wake-up and start recording video. Upon receiving the wake-up probe request the alarm generation device may, for example, generate an alarm.

The methods and systems described in reference to FIGS. 2 to 6 may also be used, for example, in a multi-room audio system where audio follows the user from room to room. For example, each room may comprise at least one Wi-Fi motion sensor (trigger Wi-Fi station 206) and at least one battery operated Wi-Fi audio device (low-power Wi-Fi station(s) 204). The battery operated audio devices may be able to go into a low-power mode until the user enters the room that they are in. Specifically, once a particular motion sensor detects motion, it may generate a wake-up probe request for the battery operated audio device(s) in its room. Upon receiving the wake-up probe request, the audio device(s) powers fully on to enable broadcasting of audio.

The methods and systems described in reference to FIGS. 2 to 6 may also be used, for example, in a multi-room video and/or audio system to enable a remote control to turn on or enable devices in any room. For example, each room may comprise a Wi-Fi enabled TV, audio device, DVD-player and/or a radio (low-power Wi-Fi station(s) 204) that has the ability to operate in a low-power mode when not in use to save power. The user then has a Wi-Fi enabled universal remote control (trigger Wi-Fi station 206). When the user enters a room, the user may press a single button on the universal remote control to wake-up all of the devices in that room. For example, the single button may cause the universal remote control to generate and transmit a wake-up probe request frame which causes all of the devices in the room to wake-up from their low-power mode.

In a second aspect the vendor-specific information element 128 is used by a Wi-Fi station to transmit status data.

Figure 7:
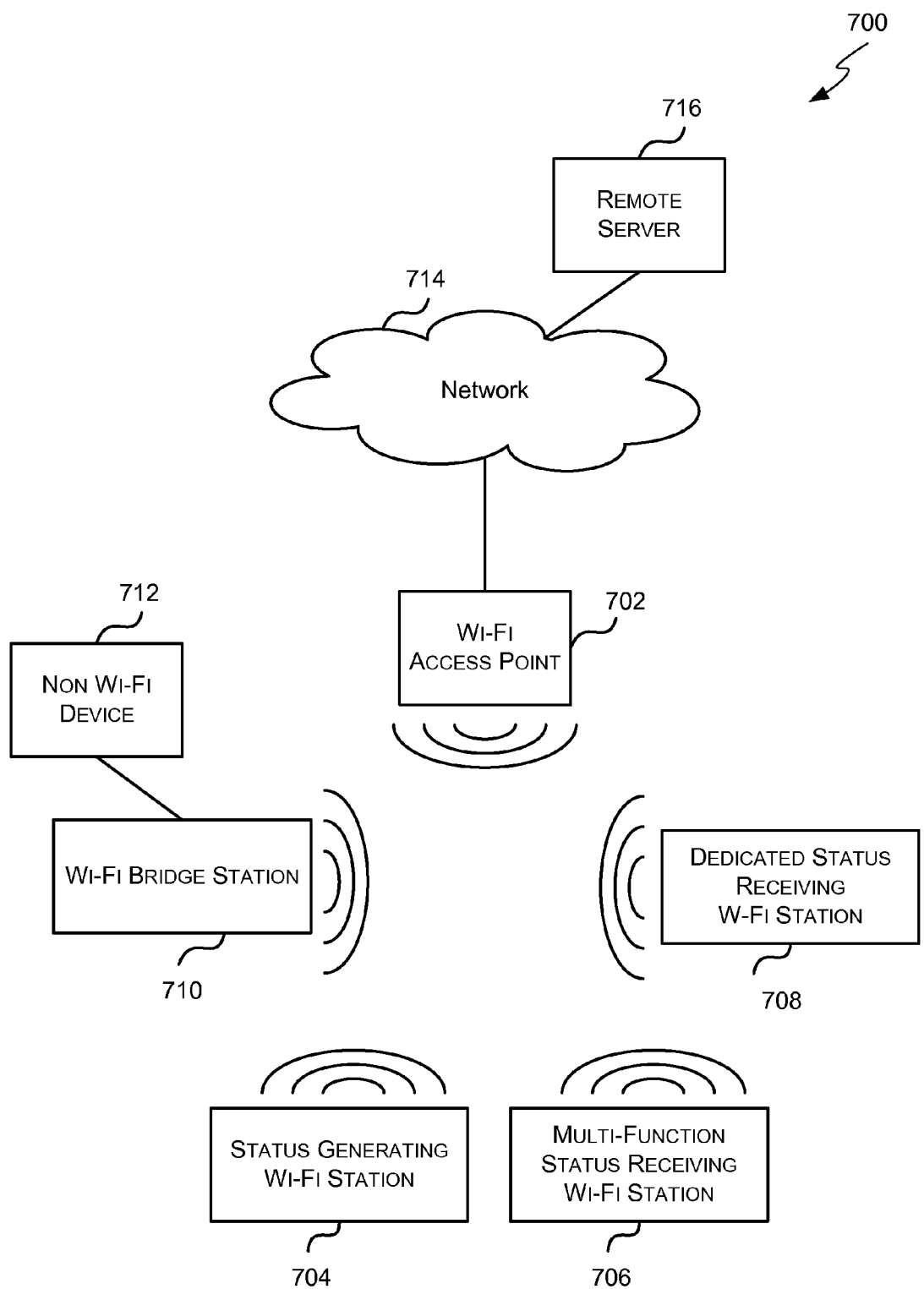
FIG. 7 is a block diagram of a system for sending status data via a probe request.

Reference is now made to FIG. 7 which illustrates a system 700 wherein Wi-Fi stations use the vendor-specific information element 128 to transmit status data. The system 700 comprises a Wi-Fi access point 702, a status generating Wi-Fi station 704, a multi-function status receiving Wi-Fi station 706, a dedicated status receiving Wi-Fi station 708, a Wi-Fi bridge or hub station 710, and a Non-Wi-Fi device 712.

The Wi-Fi access point 702, like the Wi-Fi access point 202 of FIG. 2, allows Wi-Fi stations (e.g. Wi-Fi stations 704, 706, 708 and 710) within range of the access point 702 to connect to a common Wi-Fi network and communicate with each other via the common Wi-Fi network. The Wi-Fi access point 702 may also be connected to another communication network 714, such as the Internet, which the Wi-Fi stations 704, 706, 708 and 710 may access via the Wi-Fi access point 702.

The Wi-Fi stations 704, 706, 708 and 710, like the Wi-Fi stations 204, 206 and 208 of FIG. 2, are computer-based devices that comprise a processor and a Wi-Fi module. The Wi-Fi module enables the Wi-Fi station to wirelessly communicate with other devices using the IEEE 802.11 standard. The wireless stations 704, 706, 708 and 710 may be, but are not limited to, cameras, laptops, personal computers, tablet computers, mobile phones, radios, other audio devices, and smoke detectors.

The status generating Wi-Fi station 704 is configured to generate and transmit a special probe request frame when one or more predetermined conditions are met. The special probe request frame comprises a vendor-specific information element in a predetermined format that comprises status data. This type of special probe request will be referred to herein as a status probe request. A status probe request may be used, for example, to indicate that the station is currently experiencing a problem (e.g. low battery) or that the station previously experienced a problem (e.g. was unable to connect to the Wi-Fi for a period of time).

Examples of predetermined conditions which may trigger a status probe request include, but are not limited to: the station has been unable to receive and/or transmit data over the Wi-Fi network for a predetermined period of time; loss of authentication with the Wi-Fi network; detection of an unknown Wi-Fi station on the Wi-Fi network; and the battery level for a battery-operated station has dropped below a predetermined threshold.

Status data may be any data about the status generating Wi-Fi station 704 that may be used by another device. Examples of status data that may be included in a status probe request include, but are not limited to: data about how long the station was unable to receive and/or transmit data over the Wi-Fi data network (and optionally other parameters that allow a diagnosis of the problem); data indicating system performance (e.g. quality or accuracy of a system server, such as a time server, a media server or an audio server); data indicating a Wi-Fi station's level of synchronization; data indicating synchronization with a master time server (e.g. in some cases (e.g. multi-room audio) slave stations may try to synchronize with a master station, the time synchronization data provided in the status probe request may then be used to make decisions on who is following the master etc.); and data indicating that the battery is low (and optionally the current level of the battery).

Using a status probe request frame to transmit status data allows the status generating Wi-Fi station 704 to provide status data to other devices within Wi-Fi range of the station 704 without requiring the station 704 to be fully connected to the Wi-Fi network (e.g. the station 704 does not require an IP address). This may be particularly useful, for example, in situations where a battery-operated station does not have enough energy to bring up its TCP/IP stack (thus it cannot connect/maintain its Wi-Fi connection), but wishes to transmit status information (e.g. a battery low message).

In some cases, status probe requests may be received and processed by a multi-function status receiving Wi-Fi station 706. A multi-function status receiving Wi-Fi station 706 is a Wi-Fi station that performs other functions in addition to processing status probe requests. For example, the multi-function status receiving Wi-Fi station 706 may have the ability to record video, detect motion, and/or broadcast audio; in addition to having the ability to process status probe requests. The multi-function status receiving Wi-Fi station 706 may be configured to process the status probe request directly. For example, where both the status generating Wi-Fi station 704 and the multi-function status receiving Wi-Fi station 706 have the same capabilities (e.g. both stations have the ability to record video), upon receiving a status probe request from the status generating Wi-Fi station 704 indicating that the battery level is low, the multi-function status receiving Wi-Fi station 706 may "take-over" from the status generating Wi-Fi station 706 (e.g. the multi-function status receiving Wi-Fi station 706 may start recording video). In another example, if a station receives a status probe request indicating that the Wi-Fi network is experiencing problems, the multi-function status receiving Wi-Fi station 706 may enter into a low-power mode to conserve power.

Alternatively the multi-function status receiving Wi-Fi station 706 may be configured to simply forward at least a portion of the status probe request to another device, such as a remote server 716, that will process the status data. Whether the multi-function status receiving Wi-Fi station 706 forwards the status probe request or processes the status probe request may depend on the type of status data in the status probe request. For example, in some cases the multi-function status receiving Wi-Fi station 706 may be able to take action, and in other cases the multi-function status receiving Wi-Fi station 706 may only be able to forward at least a portion of the status probe request to another device for further processing.

In other cases, status probe requests may be received and processed by a dedicated status receiving Wi-Fi station 708. A dedicated status receiving Wi-Fi station 708 is a Wi-Fi station whose main purpose is to handle and process status probe requests. The dedicated status receiving Wi-Fi station 708 may take one or more actions upon receiving a status probe request. For example, upon receiving a status probe request indicating low battery the dedicated status receiving Wi-Fi station 708 may send a message to the owner or administrator of the transmitting station that the battery is low. The message may be sent using any suitable communication means, such as email, SMS message or voice message. Alternatively, the dedicated status receiving Wi-Fi station 708 may simply forward at least a portion of the status probe request to another device, such as remote server 716.

In other cases, status probe requests may be received and processed by a Wi-Fi bridge or hub station 710. A Wi-Fi bridge or hub station 710 is a Wi-Fi station that has the ability to communicate using at least one other communication protocol in addition to Wi-Fi (e.g. IEEE 802.11). The other communication protocol may be, for example, Bluetooth™, Digital Enhanced Cordless Telecommunications (DECT), ZigBee™, G.hn, Token Ring, Ethernet, Digital Living Network Alliance (DLNA), Universal Plug and Play (uPnP), or HomePlug. Upon receiving a status probe request, the bridge or hub Wi-Fi station 710 may be configured to provide at least a portion of the status probe request (e.g. the status data) to a Non Wi-Fi device 712 via one of the other protocols supported by the bridge or hub Wi-Fi station.

An example of a non Wi-Fi device is a wireless power switch which may be using a different communications protocol or a different RF (radio frequency) channel. The wireless power switch may be configured to switch off if the user is no longer present (or conversely switch on if the user is present). Accordingly, one Wi-Fi station may be configured to detect the presence or lack of presence of a user (e.g. via a key fob or similar device). The Wi-Fi station may then transmit a status probe request indicating the status of the user (e.g. present or not present). The status probe request may be received by a bridge or hub Wi-Fi station who forwards the status probe request to the wireless power switch using the other communications protocol. The wireless power switch may then make a decision on whether to turn on/off based on the information in the status probe request.

Figure 8:
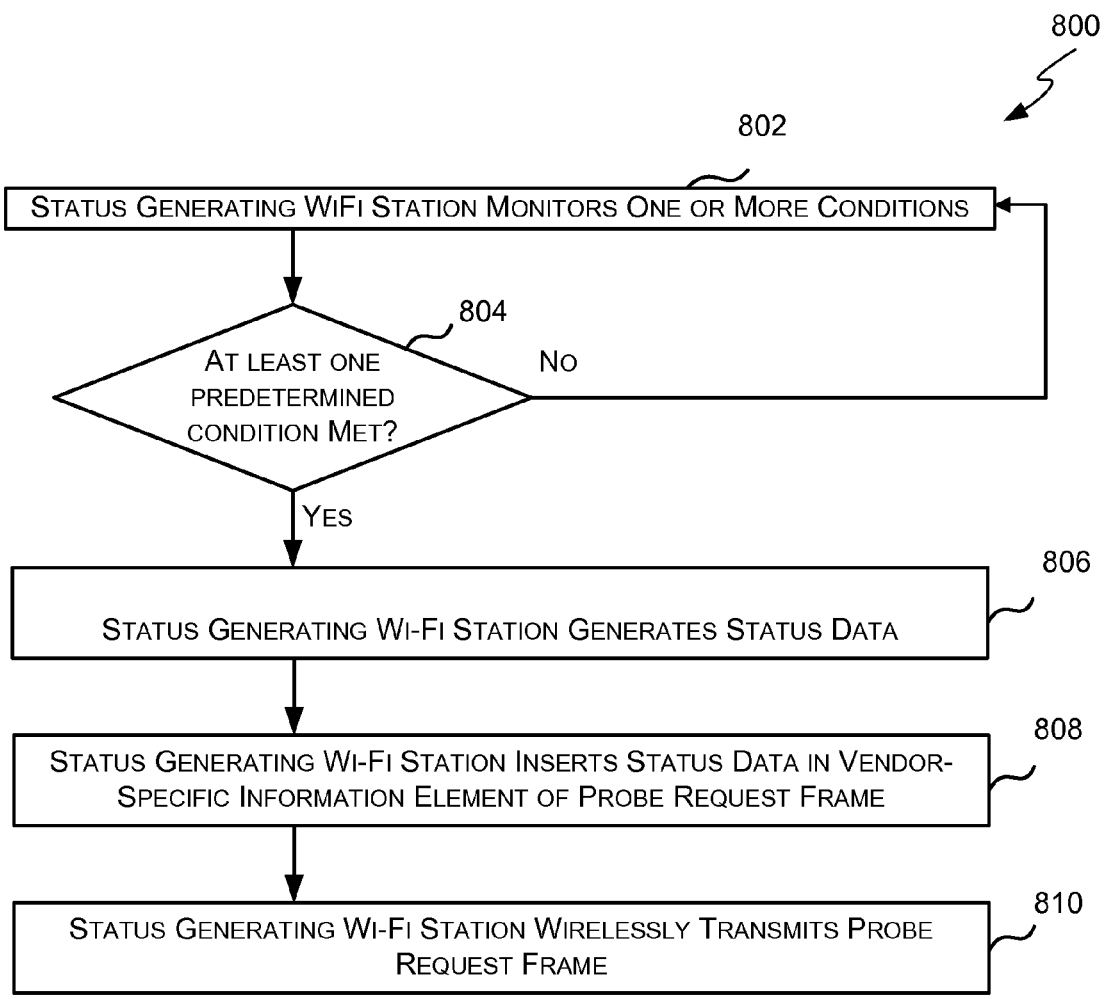
FIG. 8 is a flowchart of a method for the status generating Wi-Fi station of FIG. 7 to generate a status probe request.

Reference is now made to FIG. 8, which illustrates a flow chart of a method 800 for a status generating Wi-Fi station to generate a status probe request. At step 802, the status generating Wi-Fi station (e.g. status generating Wi-Fi station 704) monitors one or more conditions. At step 804, the status generating Wi-Fi station determines whether at least one predetermined condition is met. As described above in reference to FIG. 7, where the status generating Wi-Fi station is battery-operated the predetermined condition may be when the battery level falls below a predetermined threshold. If the status generating Wi-Fi station determines that none of the predetermined conditions are met, then the method proceeds back to step 802. If, however, the status generating Wi-Fi station determines that at least one predetermined condition is met, the method 800 proceeds to step 806. At step 806, the status generating Wi-Fi station generates status data in accordance with a predetermined format. The status data may be based on the predetermined conditions that were met in step 804. For example, if the predetermined condition is that the battery level has dropped, the status data may contain data indicating that the battery power is low. Different status data may be generated when a different predetermined condition is met. At step 808, the status generating Wi-Fi station inserts the status data in the vendor-specific element of a probe request frame to generate a status probe request frame. At step 810, the status generating Wi-Fi station then wirelessly transmits the status probe request frame.

Figure 9:
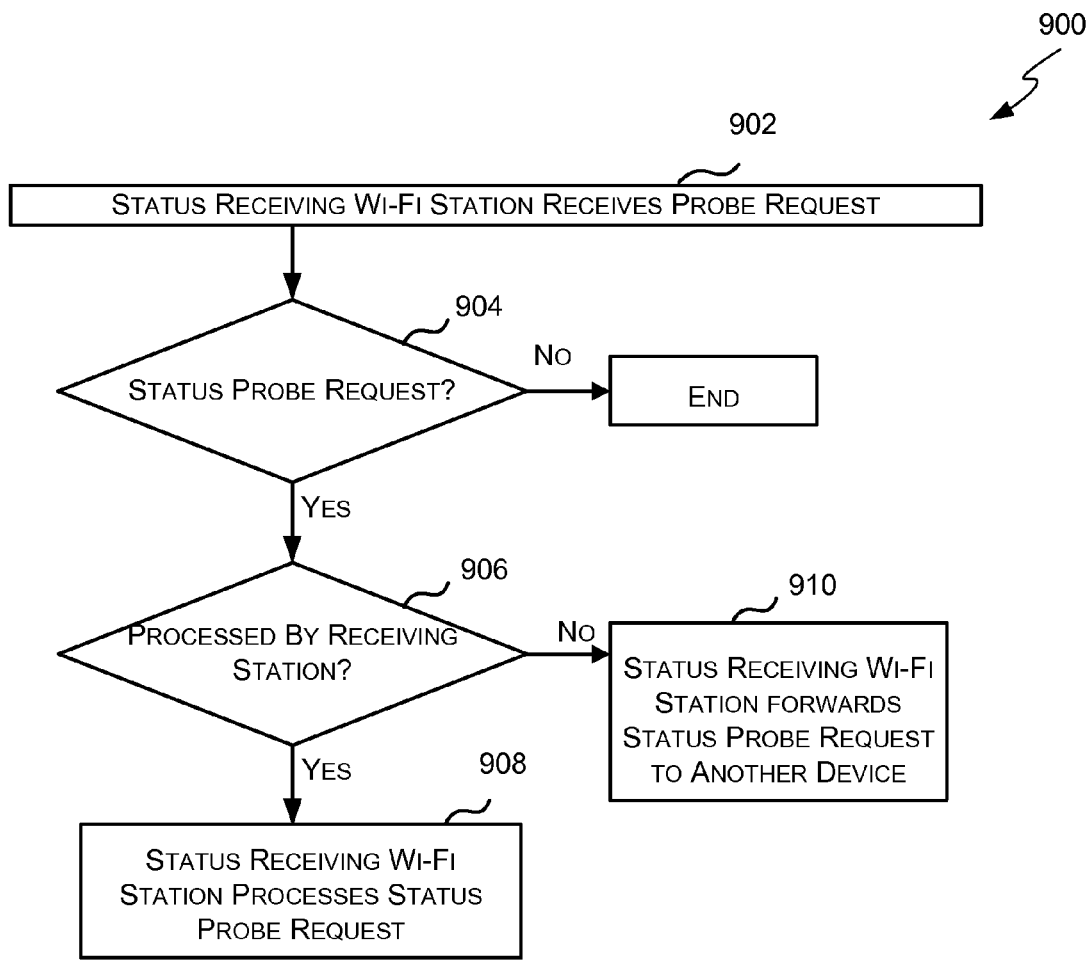
FIG. 9 is a flowchart of a method for a status receiving Wi-Fi station of FIG. 7 to process a status probe request.

Reference is now made to FIG. 9, which illustrates a flow chart of an exemplary method 900 for processing a status probe request. At step 902, a status receiving Wi-Fi station (e.g. multi-function status receiving Wi-Fi station 706, dedicated status receiving Wi-Fi station 708, or Wi-Fi bridge or hub station 710) receives a probe request. At step 904, the status receiving Wi-Fi station determines whether the probe request is a status probe request. Determining whether the probe request is a status probe request may comprise determining if the probe request comprises a vendor-specific information element that comprises status data in a predetermined format. If the status receiving Wi-Fi station determines that the probe request is not a status probe request, then the method ends. If, however, the status receiving Wi-Fi station determines that the probe request is a status probe request then the method 900 proceeds to step 906.

At step 906, the status receiving Wi-Fi station determines whether the status probe request may be processed by the status receiving Wi-Fi device. Determining whether the status probe request may be processed by the status receiving Wi-Fi device may comprise analyzing the vendor-specific element of the probe request to determine the type of status probe request. For example, the status receiving Wi-Fi station may be able to process requests from some types of Wi-Fi stations, but not others. If the status-receiving Wi-Fi station determines that it cannot process this particular status probe request then the method proceeds to step 910. If however, the status receiving Wi-Fi station determines that it has the ability to process this particular status probe request then the method proceeds to step 908.

At step 908, the status receiving Wi-Fi station processes the status probe request. Processing the status probe request may comprise executing one or more actions based on the type of status probe request. The one or more actions may comprise, for example, but are not limited to: notifying an owner (via e-mail, SMS or any other suitable means); taking over the sending station's duties; or any combination thereof. Once the status probe request frame has been processed, the method 900 ends.

At step 910, the status receiving Wi-Fi station may forward at least a portion of the status probe request to another device. The other device may, for example, be another Wi-Fi station, a remote server, or a local device that supports another protocol. Once the status probe request is forwarded, the method 900 ends.

Figure 10:
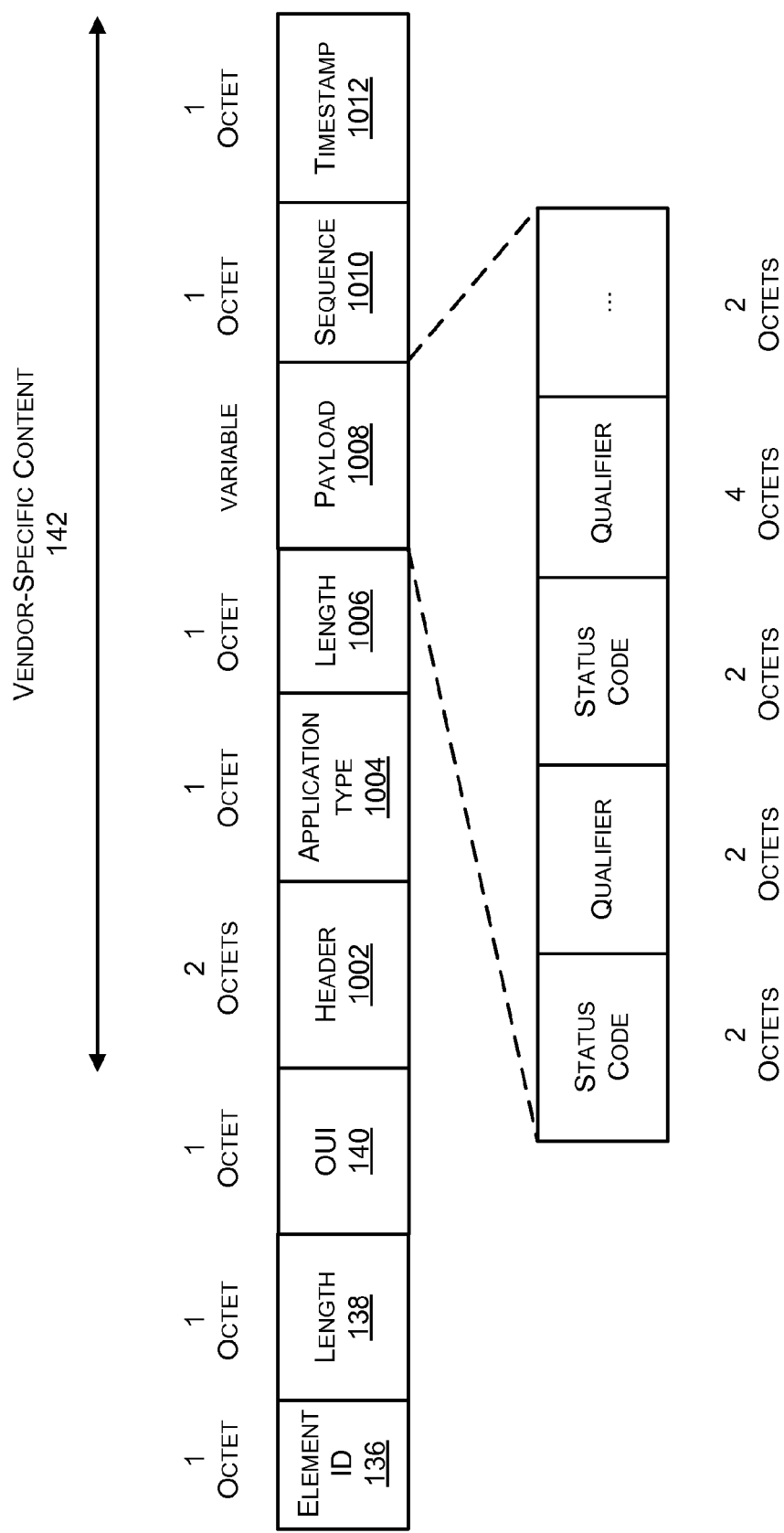
FIG. 10 is a schematic diagram of an exemplary status probe request frame.

Reference is now made to FIG. 10 which illustrates an exemplary format for the vendor-specific information element 128 of a status probe request. As described in reference to FIG. 1d, the vendor-specific information element 128 comprises a one octet element ID portion 136, a one octet length portion 138, a one octet OUI portion 140 and a variable length vendor-specific content portion 142. Similar to the wake-up probe request described in reference to FIG. 6, the vendor specific content portion 142 of a status probe request may comprise a header portion 1002, an application type portion 1004, a length portion 1006, a payload portion 1008, and a sequence portion 1010. However, in contrast to the wake-up probe request, the status probe request shown in FIG. 10 does not comprise a checksum portion. Instead, the status probe request of FIG. 10 comprises a timestamp portion 1012 that may denote the time of the status probe request and/or the time when the next status probe request is due.

In some cases, the only other difference between the format of a wake-up probe request and the format of a status probe request is the format of the payload portion 1008. For example, instead of the payload portion comprising a list of command codes; the payload portion 1008 may comprise a list of status codes where each status code indicates a particular status. Table 3 provides an example list of statuses and their associated codes. In some cases one or more of the status command codes may be followed by a specific qualifier. For example, a low battery status may be followed by a numerical value indicating the percentage of battery remaining. Whether or not there is any qualifying information may depend on the particular status. Furthermore, the size of the qualifier field may also depend on the particular status. For example, some qualifiers may be two octets in size where others may be four octets in size.

TABLE 3

| Status | Value | Qualifier |
| --- | --- | --- |
| Low Battery | 0x0001 | % of battery remaining |
| Unable to Communicate with Wi-Fi data network | 0x0002 | Time station was unable to communicate with Wi-Fi data network |
| Synchronization Level with Master Good | 0x0003 | |
| Synchronization Level with Master Poor | 0x0004 | |

It will be evident to a person of skill in the art that the list provided in Table 3 is exemplary and that the methods and systems described herein may be implemented with more or fewer status codes or with a different set of status codes.

The methods and systems described in reference to FIGS. 7 to 10 may be used, for example, by smoke alarms to indicate a low-battery, or window or door sensors to indicate a window or door is open. Using the methods and systems described herein to transmit this type of information allows the devices (smoke alarms, sensors) to transmit data in a low-power way using a standard protocol that is used in most homes and offices making it easy to integrate with existing devices and infrastructure.

In a third aspect the vendor-specific information element 128 is used by a Wi-Fi station to transmit wake-up data (as described in references to FIGS. 2 to 6) and status data (as described in reference to FIGS. 7 to 10) in the same probe request frame. For example, in this aspect a single Wi-Fi station may perform the functions of the status generating Wi-Fi station of FIG. 7 and the trigger Wi-Fi station of FIG. 2. Specifically, when this single Wi-Fi station detects one or more predetermined conditions are met, it may generate both status data and wake-up data and then insert the status data and the wake-up data into the vendor-specific information element 128 of a probe request frame to generate a status wake-up probe request frame. The single Wi-Fi station then wirelessly transmits the status wake-up probe request frame.

For example, the single Wi-Fi station of this aspect may be a motion sensor that upon detecting motion generates wake-up data telling another station or stations (e.g. a video camera) to wake-up and status data indicating that there is an intruder. In response to the wake-up data, a low-power Wi-Fi station receiving the status wake-up probe request frame wakes-up from the low-power mode, and in response to the status data, the low-power Wi-Fi station performs one or more actions. For example, where the low-power Wi-Fi station is a video camera, the low-power Wi-Fi station may begin recording video in response to the status data.

The term 'processor' and 'computer' are used herein to refer to any device with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The term 'upon' is used herein to refer to an action or operation which is performed in response to a trigger action, signal etc. It will be appreciated that the response may be an attenuated response and so the term 'upon' is not limited to an immediate temporal relationship between the trigger and the resultant action.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method to wirelessly transmit data, the method comprising:
   generating at a first Wi-Fi station data to be transmitted to another Wi-Fi station, the data comprising at least one of status data and wake-up data;
   inserting at the first Wi-Fi station the generated data in a vendor-specific information element of a probe request frame; and
   wirelessly transmitting at the first Wi-Fi station the probe request frame;
   wherein the first Wi-Fi station and the other Wi-Fi station are configured to wirelessly communicate via a Wi-Fi network established by an access point, and the probe request frame is transmitted by the first Wi-Fi station when the first Wi-Fi station does not have a valid IP address, or the probe request frame is received by the other Wi-Fi station when the other Wi-Fi station does not have a valid IP address.

2. The method according to claim 1, wherein the wake-up data is arranged to cause the other Wi-Fi station to wake-up from a low-power mode.

3. The method according to claim 1, further comprising:
   determining at the first Wi-Fi station whether one or more predetermined conditions are met; and
   wherein the first Wi-Fi station generates the data to be transmitted if at least one predetermined condition is met.

4. The method according to claim 1, wherein the probe request frame is a broadcast probe request frame.

5. The method according to claim 1, wherein the probe request frame comprises the wake-up data and the status data.

6. A system to wirelessly transmit data, the system comprising a first Wi-Fi station, and the first Wi-Fi station comprising:
   a processor configured to:
      generate data to be transmitted to another Wi-Fi station, the data comprising at least one of status data and wake-up data, and
      insert the generated data in a vendor-specific information element of a probe request frame; and
   a Wi-Fi module configured to wirelessly transmit the probe request frame;
   wherein the first Wi-Fi station and the other Wi-Fi station are configured to wirelessly communicate via a Wi-Fi network established by an access point, and the probe request frame is transmitted by the first Wi-Fi station when the first Wi-Fi station does not have a valid IP address, or the probe request frame is received by the other Wi-Fi station when the other Wi-Fi station does not have a valid IP address.

7. The system according to claim 6, wherein the wake-up data is arranged to cause the other Wi-Fi station to wake-up from a low-power mode.

8. The system according to claim 6, further comprising the other Wi-Fi station, wherein the other Wi-Fi station is configured to:
   receive the probe request frame; and
   in response to receiving the probe request frame, execute one or more actions.

9. The system according to claim 8, wherein the other Wi-Fi station is operating in a low-power mode when it receives the probe request frame comprising the wake-up data and the one or more actions executed by the other Wi-Fi station comprises waking up the other Wi-Fi station from the low-power mode.

10. The system according to claim 6, further comprising a non-Wi-Fi device configured to:
    determine whether one or more predetermined conditions are met; and
    if at least one predetermined condition is met, transmit a notification from the non-Wi-Fi device to the first Wi-Fi station that at least one predetermined condition is met;
    wherein the first Wi-Fi station generates the data to be transmitted in response to receiving the notification from the non-Wi-Fi device that at least one predetermined condition is met.

11. The system according to claim 10, wherein the notification is transmitted using a protocol other than Wi-Fi.

12. The system according to claim 6, wherein the probe request frame is a
broadcast probe request frame.

13. The system according to claim 6, wherein the probe request frame comprises the wake-up data and the status data.

14. A Wi-Fi station comprising:
    a Wi-Fi module configured to wirelessly receive a probe request frame from another Wi-Fi station, the probe request frame comprising at least one of status data and wake-up data in a vendor-specific information element of the probe request frame; and
    a processor configured to:
        execute one or more actions in response to receiving the probe request frame;
    wherein the Wi-Fi station and the other Wi-Fi station are configured to wirelessly communicate via a Wi-Fi network established by an access point, and the probe request frame is transmitted by the other Wi-Fi station when the other Wi-Fi station does not have a valid IP address, or the probe request frame is received by the Wi-Fi station when the Wi-Fi station does not have a valid IP address.

15. The Wi-Fi station according to claim 14, wherein the processor is further configured to operate the Wi-Fi module in a low-power mode and the one or more actions executed by the processor comprises:
    determining whether the received probe request frame comprises a vendor-specific information element comprising wake-up data; and
    if the probe request frame comprises the vendor specific information element comprising wake-up data, waking-up the Wi-Fi station from the low-power mode.

16. The Wi-Fi station according to claim 15, wherein the processor is further configured to determine if one or more predetermined conditions are met and if at least one predetermined condition is met, operate the Wi-Fi device in the low-power mode.

17. The Wi-Fi station according to claim 15, wherein operating the Wi-Fi station in the low-power mode comprises suspending at least a portion of the Wi-Fi station and waking-up the Wi-Fi station from the low-power mode comprises enabling the at least a portion of the Wi-Fi station.

18. The Wi-Fi station according to claim 14, wherein the probe request frame comprises the status data and the one or more actions executed by the processor comprises forwarding at least a portion of the probe request frame to another device.

19. The Wi-Fi station according to claim 14, wherein the probe request frame comprises the status data and the one or more actions executed by the processor comprises processing the probe request frame.

* * * * *